United States Patent [19]

Heusser

[11] Patent Number: 4,744,542

[45] Date of Patent: May 17, 1988

[54] HYDRAULIC CONTROL APPARATUS

[75] Inventor: Martin Heusser, Munich, Fed. Rep. of Germany

[73] Assignee: Heilmeier & Weinlein Fabrik fur Oel-Hydraulik GmbH & Co. KG, Munich, Fed. Rep. of Germany

[21] Appl. No.: 37,028

[22] Filed: Apr. 10, 1987

[30] Foreign Application Priority Data

Apr. 15, 1986 [DE] Fed. Rep. of Germany ....... 3612684

[51] Int. Cl.[4] ............................................ F16K 31/124

[52] U.S. Cl. .............................. 251/30.01; 251/30.02; 251/30.05

[58] Field of Search .................... 251/25, 30.01, 30.02, 251/30.05

[56] References Cited

U.S. PATENT DOCUMENTS 4,476,893 10/1984 Schwelm ..................... 251/30.01 X
4,478,245 10/1984 Bender ......................... 251/30.01 X

FOREIGN PATENT DOCUMENTS 2914196 10/1980 Fed. Rep. of Germany ... 251/30.02
137615 9/1979 German Democratic Rep. ................................ 251/30.02

OTHER PUBLICATIONS

Trade Journal Olhydraulik und Pneumatik, 25, (1981), No. 8, pp. 617-619 and 622-624.

*Primary Examiner*—Gerald A. Michalsky

*Attorney, Agent, or Firm*—Kinzer, Plyer, Dorn, McEachran & Jambor

[57] ABSTRACT

The invention relates to a hydraulic control apparatus comprising a hydraulically adjustable throttle opening between an inlet passage and an outlet passage, a three-way pilot valve connected to an external actuator and having its inlet connected to a control pressure inlet passage, its control outlet being connected to the throttle valve in such a manner that the throttle valve element thereof is adapted to be biased in opposition to the pressure in the outlet passage and to the force of a spring. Known control apparatus require the employ of a displacement sensor for sensing the position or displacement of the throttle valve element and for correspondingly acting on the actuator to thereby vary the actuating force thereof for maintaining the opening degree of the throttle opening. This construction involves considerable complications. It is also disadvantageous that the pilot valve is subjected to the full operating pressure, requiring it to be of a highly accurate and therefor expensive construction. According to the invention the second outlet of the three-way pilot valve is connected to the outlet passage, and the valve element of the pilot valve is subjected to the pressure at the control outlet in opposition to the actuating force and to the pressure at the second outlet, and the inlet pressure supplied to the pilot valve is higher than the outlet pressure at least by the maximum possible pressure difference over the pilot valve.

10 Claims, 1 Drawing Sheet

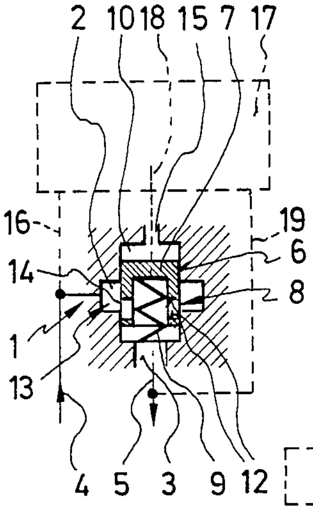
FIG. 1
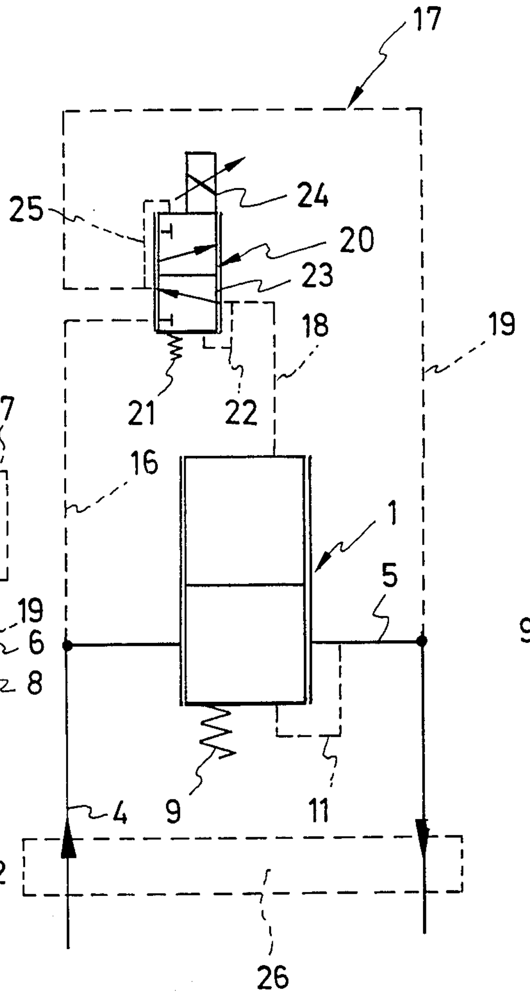
FIG. 2
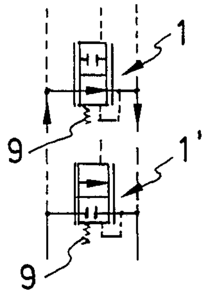
FIG. 3
FIG. 4

HYDRAULIC CONTROL APPARATUS

DESCRIPTION

The present invention relates to a hydraulic control apparatus of the type defined in the generic clause of patent claim 1.

Known from practical use are control valves which are particularly suitable for speed and positional control of movements in a direction against a load. There is provided a hydraulic control apparatus having a control circuit including the throttle valve and the three-way pilot valve as well as the external actuator. In response to the actuating force of the actuator, the three-way pilot valve generates at its control outlet a pressure acting on the throttle element in opposition to the force of the spring and to the pressure in the outlet passage to thereby maintain a determined preselected opening degree of the throttle valve. The second outlet of the three-way pilot valve is connected to the reservoir to thereby permit the pressure medium to be drained for lowering the pressure at the control outlet. To enable the control apparatus to react to pressure variations in the inlet and/or outlet passage, a displacement sensing device for controlling the position of the throttle element is required for sensing the actual position of the throttle element and for accordingly acting on the actuator to thereby modify the actuating force thereof acting on the pilot valve to thus hydraulically maintain the previously selected opening degree of the throttle valve. The displacement sensing device is of complicated construction and thus expensive. The three-way pilot valve is likewise of complicated and expensive construction, as it has to absorb substantially the full operating pressure over thedrain pressure towards the reservoir. In addition, this control apparatus requires the use of an intricate electric control circuit.

Known from the trade journal Ölhydraulik+-Pneumatik, 25 (1981), No. 8, pages 617 to 624, are electrically controlled two-way modular valves that had been developed according to a novel concept. Shown on upper page 618 are different conceptions of the reset operation, amongst others also with so-called follower piston systems. This last named principle is only conditionally useful, however, for control apparatus of the type defined in the introduction, as it involves inadmissible leakage losses for various applications in the zero position, while showing a behaviour in operation with an initial threshold response occurring only at a determined pressure.

It is an object of the invention to provide a control apparatus of the type defined in the introduction, which is capable, in a simple manner and by the use of a simple and inexpensive pilot valve, of maintaining a selected throttle valve opening status irrespective of pressure variations in the inlet and/or outlet passage.

The thus stated object is attained according to the invention by the characteristics set forth in the characterizing clause of claim 1.

In this configuration the pressure in the outlet passage is linearly superimposed on the pressure at the control outlet of the pilot valve, so that the pressure difference between the pressure at the control outlet of the pilot valve and the outlet passage pressure is always proportional to the force of the external actuator. The pilot valve has only to absorb the relatively small pressure difference between the pressure at its control outlet and the outlet passage pressure, which offers the advantage that the pilot valve may be of a simple and inexpensive construction while still furnishing a highly effective amplification of the force of the external actuator. This results in the particular advantage of the control apparatus, in that an actuator having a relatively small actuating force is sufficient for readily controlling high pressures and large flow volumes. If the actuator is for instance a proportional solenoid, the latter would be required to develop only weak forces, so that it may be of a compact and inexpensive construction. The great forces which may be required in the case of high operating pressures are generated by the pilot valves with the aid of the pressure at its control outlet, itself generated with the aid of the pressure in the inlet passage. This pressure may be relatively high, but may on the other hand be compensated by the pressure in the outlet passage to such a degree, that the actuator has to develop only relatively small actuating forces irrespective of the high pressures to be processed, and that the pilot valve has to absorb only the relatively small pressure difference mentioned above. The only basic precondition for the correct operation of the hydraulic control apparatus is that the pressure prevailing in the inlet passage is always higher than the pressure in the outlet passage so that the pressure required at the control outlet of the pilot valve, which has to be higher than the pressure in the outlet passage, can be generated, and that further the pressure in the outlet passage acts on the throttle element in opposition to the pressure acting thereon from the control outlet of the pilot valve. The opening degree of the throttle valve selected by setting the actuating force of the actuator is thus automatically maintained irrespective of pressure variations in the inlet and/or outlet passage without the use of a separate displacement sensing device. Since the pilot valve has only to absorb the small pressure difference, it is capable of operating practically in the zero-transition range and of extremely sensitively compensating pressure variations while still being of quick response on starting or terminating operation of the control apparatus. The most important advantages of this construction are the possibility of employing a relatively weak actuator even in the case of high pressures and great flow volumes, and the possibility of employing a simple and therefore inexpensive pilot valve without the use of an expensive displacement sensing device.

In an advantageous embodiment of the invention the pilot valve may be a pressure reducing valve having its reservoir outlet connected to the outlet passage. The use of a commercially available pressure reducing valve is particularly effective and inexpensive.

In another embodiment of the invention the valve element of the pilot valve may be subjected to the action of a weak reset spring parallel to the action thereon of the pressure at the control outlet. This embodiment offers the advantage that on termination of the operation of the apparatus the pilot valve is automatically reset to its zero position without its valve element being retained at an intermediate position.

According to a further important aspect of the invention, the external actuator may be a proportional solenoid developing an actuating force in proportion to the current supply, the pressure difference between the pressure at the control outlet and the pressure at the second outlet of the pilot valve being at all times proportional to the actuating force of the proportional solenoid. This offers the advantage that the opening degree of a throttle valve selected by setting a determined actuating force is automatically maintained irrespective of pressure variations, and that an accurately proportional variation of the opening degree of the throttle valve is achieved in response to the current supply to the proportional solenoid. The proportional solenoid may be designed to develop relatively weak forces, so that it may be of a compact and inexpensive construction.

According to a further aspect of the invention, the throttle element may be adapted to be moved to a position obturating the throttle valve orifice by the force of the associated spring. In the zero position of the pilot valve the throttle valve will thus automatically assume its close position as required for certain applications. The spring acting on the throttle element otherwise determines the pressure difference between the pressure at the control outlet of the pilot valve and the pressure in the outlet passage.

According to another aspect useful for other applications, the throttle element may be adapted to be moved to a position fully opening the throttle valve orifice by the force of the associated spring. In this case the throttle valve will automatically assume its fully opened position in the zero position of the pilot valve.

According to a further important aspect of the invention, the throttle valve may be the control valve of a pressure compensating device. In this case the control apparatus cooperates with the pressure compensating device in the manner of a load-compensated flow control valve apparatus noteworthy for its compact overall dimensions and a small number of components. In such an arrangement the throttle valve with its control apparatus acts as the control throttle valve of the pressure compensating device, the latter otherwise ensuring at all times the higher pressure in the inlet passage.

Embodiments of the invention shall now be described by way of example with reference to the accompanying drawings, wherein:

FIG. 1 shows a throttle valve in combination with a diagrammatically indicated hydraulic control apparatus, FIG. 2 shows a block diagram of a load-compensated flow control apparatus, and FIGS. 3 and 4 shows two different embodiments of the throttle valve.

Diagrammatically shown in FIG. 1 is a throttle valve 1 disposed in a housing not shown in detail. Provided in the housing is an annular passage 2 forming part of a throttle valve chamber 6 communicating with a downwards extending outlet port 3. Connected to annular passage 2 is an inlet passage 4, while outlet port 3 is in communication with an outlet passage 5. Displaceably mounted in throttle valve chamber 6 is a throttle element 7 in the form of a valve piston formed with radially extending passages 8. A spring 9 acts on throttle element 7 to bias it upwards in FIG. 1. Throttle element 7 divides throttle valve chamber 6 into an upper chamber 10 and a lower chamber 11. The edges of radial passages 8 cooperate with the boundary edges 13 of annular passage 2 to form a throttle opening 14 the size of which is variable in accordance with the stroke of throttle element 7. Chamber 10 has a port 15 opening thereinto. A control passage 16 connected to inlet passage 4 leads to a diagrammatically indicated control apparatus 17 communicating with port 15 through a passage 18, and with outlet passage 5 through another passage 19. In place of the control passage 16 extending from inlet passage 4 there might be provided a separate control passage supplied from an external source.

Downward displacement of throttle element 7 in FIG. 1 results in the size of throttle opening 14 being reduced. In the lower end position of throttle element 7 throttle opening 14 is closed. In the upper end position of throttle element 7 the throttle opening is open to its full extent.

From FIG. 2 it is evident that hydraulic control apparatus 17 comprises a three-way pilot valve 20, which may be a conventional pressure reducing valve of simple construction. A valve element 23 of three-way pilot valve 20 is biased in an upward direction by a weak reset spring 21 and by a pressure derived from passage 18 through a pilot control passage 22. The forces thus acting on valve element 23 are opposed by a pressure derived from passage 19 through a control passage 25 to act on the upper and of valve element 23. Valve element 23 is further acted on by an external actuator 24 adapted to be externally actuated for varying its actuating force which may for instance be directed downwards. Actuator 24 may preferably be a proportional solenoid the magnetic force of which is variable in proportion to the current supplied thereto.

In FIG. 2 it is further indicated that inlet passage 4 and outlet passage 5 extend through a pressure compensating device 26 effective to ensure that the pressure in inlet passage 4 is at all times higher than that in outlet passage 5. The entire arrangement thus forms a load-compensated flow control valve apparatus.

The hydraulic control apparatus operates as follows:

Before operation is initiated, spring 9 has displaced throttle element 7 to its upper end position, so that throttle opening 14 is fully uncovered. Actuator 24 does not exert any actuating force. Reset spring 21 has displaced valve element 23 to its upper end position as diagrammatically shown in FIG. 2, so that passage 18 is in communication with passage 19.

When a pressure is applied to the system, actuator 24 is adjusted to exert a predetermined actuating force corresponding to a determined opening degree of throttle opening 14. Valve element 23 of pilot valve 20 is displaced downwards, so that the pressure $P_A$ derived from passage 16 acts to generate a pressure $P_X$ at the control outlet of pilot valve 20, this pressure acting though passage 18 on throttle element 7 from above to displace it downwards for gradually closing throttle opening 14. The pressure B meanwhile built up in outlet passage 5 acts to generate a pressure $P_B$ in passage 19, this pressure acting though control passage 25 to bias valve element 23 downwards in cooperation with the actuating force of actuator 24, so that a pressure difference is established between pressure $P_X$ and pressure $P_B$, this pressure difference being accurately proportional to the actuating force of actuator 24. The force of spring 9 cooperates with the pressure B in passage L to maintain throttle element 7 at a predetermined position of its stroke in which the predetermined opening degree of the throttle opening is maintained and a state of equilibrium is established.

If throttle valve 1 is employed in combination with a pressure compensating device 26 (as indicated in FIG. 1), when pressure A in inlet passage 4 increases, the pressure $P_B$ in passage 19 and control passage 25 will likewise rise to displace valve element 23 slightly downwards, causing the pressure $P_X$ in passage 18 and control passage 22 to rise correspondingly. This pressure opposes the tendency of the increased pressure $P_B$ to displace throttle element 7 upwards, so that the latter is maintained at the position of its stroke corresponding to the preselected opening degree of throttle opening 14.

If on the other hand throttle valve 1 is used without a pressure compensating device, any rise or drop of pressure A will not result in displacement of throttle element 7, since this pressure A is supplied to both throttle element 7 and pilot valve 20 in a radial direction, so that it is incapable of generating any force in the axial direction.

Any rise of the pressure B in outlet passage 5, however, which would tend to displace throttle element 7 upwards via control passage 11, causes valve element 23 to be slightly displaced downwards by acting thereon through control passage 25, so that pressure $P_A$ acts to correspondingly increase pressure $P_X$ in passage 18 to thereby maintain or reestablish the preselected opening degree of throttle opening 14.

Any drop of the pressure B in outlet passage would result in the tendency of pressure $P_X$ in passage 18 to displace throttle element 7 downwards. As there is a simultaneous drop of the pressure $P_B$ in passage 19 and control passage 25, however, the higher pressure still prevailing in control passage 22 acts to displace valve element 23 slightly upwards, resulting the pressure $P_X$in passage 18 being correspondingly reduced via passage 19, so that the opening degree of throttle opening 14 is maintained.

In this manner the opening degree of throttle opening 14 as selected by the setting of actuator 24 is automatically maintained irrespective of pressure variations.

With respect to the control apparatus 17 it is of no importance whether it is the volume of the pressure medium flowing through throttle opening 14, or the pressure drop. This is likewise of no importance for many applications, in which it is only decisive to maintain a predetermined opening degree of the throttle opening 14. If the flow volume is also to be kept constant,, the pressure compensating device 26 may be employed to this purpose in the usual manner.

FIGS. 3 and 4 show two possible designs of the throttle valve. FIG. 3 shows a diagrammatical illustration of the throttle valve shown in FIG. 1, in which spring 9 acts to ensure that throttle valve 1 assumes its fully open state in the zero position.

In the embodiment of throttle valve 1' shown in FIG. 4, however, it is provided that the throttle valve assumes its fully closed state in the zero position, so that the communication between the inlet passage and the outlet passage is interrupted. The basic requirement for the correct operation of the control apparatus is that the pressure $P_A$ and thus the pressure in inlet passage 4 is at least equal to or higher than the sum of the pressure $P_B$ corresponding to the pressure B in outlet passage 5, and the maximum pressure difference capable of being absorbed by the three-way pilot valve 20. The pressure $P_X$ prevailing in passage 18 corresponds to the sum of the pressure $P_B$ in passage 19 (corresponding to the pressure B in outlet passage 5), and the actual pressure difference over three-way pilot valve 20, i.e. to the pressure difference between pressure $P_X$ and pressure $P_B$.

It is also of importance that in its zero position the three-way pilot valve operates practically without leakage losses, so that it may be employed without any problems in fork lift trucks and the like.

I claim:

1. A hydraulic control apparatus comprising a throttle valve (1) including a hydraulically adjustable orifice (14) disposed between an inlet passage (4) and an outlet passage (5), and a three-way pilot valve (20) having a valve element (23) connected to an external actuator (24), the inlet of said pilot valve being connected to an inlet control pressure passage (16), and its control outlet, to a chamber (10) of said throttle valve (1) in which a throttle element (7) is displaceable against the pressure in said outlet passage (5) and the force of a spring (9), characterized in that the second outlet of said three-way pilot valve (20) is connected to said outlet passage (5), that said valve element (23) of said three-way pilot valve (20) is subjected to the pressure at said control outlet in opposition to the force of said external actuator (24), and in the opposite direction, to the pressure at said second outlet of said three-way pilot valve (20), and that the pressure in said inlet passage (4) is greater than the pressure in said outlet passage (5) at least by the maximum value of the possible pressure difference between the pressure at said control outlet and the pressure at said second outlet.

2. A hydraulic control apparatus according to claim 1, characterized in that said three-way pilot valve (20) is a pressure reducing valve having its reservoir outlet connected to said outlet passage (5).

3. A hydraulic control apparatus according to claim 2, characterized in that said valve element (23) of said three-way pilot valve (20) is subjected to the action of a weak reset spring (21) parallel to the pressure at said control outlet.

4. A hydraulic control apparatus according to claim 3, characterized in that said external actuator (24) is a proportional solenoid having an actuating force proportional to the current supply, the pressure difference between the pressure at said control outlet and the pressure at said second outlet of said three-way pilot valve (20) being at all times proportional to the actuating force of said proportional solenoid.

5. A hydraulic control apparatus according to claim 4, characterized in that said throttle element (7) is movable to a position which varies said orifice (14) by the force of said spring (9).

6. A hydraulic control apparatus according to claim 1, characterized in that said valve element (23) of said three-way pilot valve (20) is subjected to the action of a weak reset spring (21) parallel to the pressure at said control outlet.

7. A hydraulic control apparatus according to claim 1, characterized in that said external actuator (24) is a proportional solenoid having an actuating force proportional to the current supply, the pressure difference between the pressure at said control outlet and the pressure at said second outlet of said three-way pilot valve (20) being at all times proportional to the actuating force of said proportional solenoid.

8. A hydraulic control apparatus according to claim 1, characterized in that said throttle element (7) is adapted to be moved to a position obturating said orifice (14) by the force of said spring (9).

9. A hydraulic control apparatus according to claim 1, characterized in that said throttle element (7) is adapted to be moved to a position fully opening said orifice (14) by the force of said spring (9).

10. A hydraulic control apparatus according to claim 1 combined with a pressure compensating device (26), characterized in that said throttle valve (1) is the control valve of said pressure compensating device (26).

* * * * *